US009874897B2

(12) United States Patent
Ishigaki

(10) Patent No.: US 9,874,897 B2
(45) Date of Patent: Jan. 23, 2018

(54) INTEGRATED INDUCTOR

(71) Applicant: TOYOTA MOTOR ENGINEERING & MANUFACTURING NORTH AMERICA, INC., Erlanger, KY (US)

(72) Inventor: Masanori Ishigaki, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/145,207

(22) Filed: May 3, 2016

(65) Prior Publication Data

US 2017/0322583 A1 Nov. 9, 2017

(51) Int. Cl.

| | |
|---|---|
| ***H02M 3/335*** | (2006.01) |
| ***G05F 5/00*** | (2006.01) |
| ***H01F 27/28*** | (2006.01) |
| ***H01F 27/24*** | (2006.01) |

(52) U.S. Cl.

CPC ............... *G05F 5/00* (2013.01); *H01F 27/24* (2013.01); *H01F 27/2823* (2013.01)

(58) Field of Classification Search

CPC .......... H01F 27/24; H01F 27/255; G05F 5/00; H02M 3/28

USPC ......... 363/17, 37, 81, 89, 95, 126, 129, 132; 323/308, 333, 363, 334, 301; 336/155, 336/178, 212, 180, 214, 185, 233

See application file for complete search history.

(56) References Cited

U.S. PATENT DOCUMENTS 4,257,087 A 3/1981 Cuk
4,274,133 A 6/1981 Cuk et al.
4,853,668 A * 8/1989 Bloom .................... H02M 3/28 323/362
5,619,400 A * 4/1997 Bowman .................. H01F 3/14 363/15
5,731,666 A * 3/1998 Folker .................... H05B 41/28 315/276
6,147,886 A * 11/2000 Wittenbreder .... H02M 3/33592 363/132
6,252,383 B1 6/2001 Wittenbreder
6,784,644 B2 8/2004 Xu et al.
6,952,353 B2 10/2005 Yan et al.
7,034,647 B2 4/2006 Yan et al.
7,132,812 B1 * 11/2006 Wu ......................... H01F 27/28 318/448
7,136,293 B2 * 11/2006 Petkov .................... H01F 27/38 336/170

(Continued)

*Primary Examiner* — Rajnikant Patel

(74) *Attorney, Agent, or Firm* — Oblon, McClelland, Maier & Neustadt, L.L.P.

(57) ABSTRACT

An integrated inductor assembly includes a magnetic core including a center leg in parallel with a first outer leg and a second outer leg on either side of the center leg. A first set of windings of a first inductor are wrapped around the center leg, the first outer leg of the magnetic core, and the second outer leg of the magnetic core. A second set of windings of a second inductor are also wrapped around the center leg, the first outer leg, and the second outer leg of the magnetic core. The first set of windings and the second set of windings include center windings wrapped around the center leg of the magnetic core, first outer windings wrapped around the first outer leg of the magnetic core, and second outer windings wrapped around the second outer leg of the magnetic core.

19 Claims, 9 Drawing Sheets

(56) References Cited

U.S. PATENT DOCUMENTS

| | | | | |
|---|---|---|---|---|
| 7,671,713 | B2 * | 3/2010 | Xu | H01F 27/2847 336/131 |
| 7,974,069 | B2 * | 7/2011 | Mao | H01F 27/28 361/268 |
| 9,171,665 | B2 | 10/2015 | Silva et al. | |
| 9,295,145 | B1 * | 3/2016 | Folker | H01F 27/326 |
| 2011/0267848 | A1 | 11/2011 | Satake et al. | |

* cited by examiner

INTEGRATED INDUCTOR

BACKGROUND

Power conversion circuits often include multiple inductor components that contribute to increased circuit volume and reduced power density due to bulkiness of the magnetic cores of the inductors. Integrated inductor assemblies allow multiple inductors to be implemented on a single magnetic core, which can reduce a total circuit volume. U.S. Pat. No. 9,171,665 to Silva et al. describes an integrated inductor assembly that includes a magnetic core including two separate sides where each side is wound by a conductive wire to form an inductor, and the two resultant inductors can operate independently.

SUMMARY

In an exemplary implementation, an integrated inductor assembly can include a magnetic core including a center leg in parallel with a first outer leg and a second outer leg on either side of the center leg. A first set of windings of a first inductor can be wrapped around the center leg, the first outer leg of the magnetic core, and the second outer leg of the magnetic core. A second set of windings of a second inductor can also be wrapped around the center leg, the first outer leg, and the second outer leg of the magnetic core. The first set of windings and the second set of windings can include center windings wrapped around the center leg of the magnetic core, first outer windings wrapped around the first outer leg of the magnetic core, and second outer windings wrapped around the second outer leg of the magnetic core.

The first set of windings can wrapped around a first half of the center leg, the first outer leg, and the second outer leg of the magnetic core, and the second set of windings can be wrapped around a second half of the center leg, the first outer leg, and the second outer leg of the magnetic core. The first half of the center leg, the first outer leg, and the second outer leg of the magnetic core can be separated from the second half of the center leg, the first outer leg, and the second outer leg of the magnetic core by an air gap corresponding to predetermined inductance properties of the first inductor and the second inductor.

The first inductor can be configured to produce a first amount of flux in response to an input current that is independent of a second amount of flux produced by the second inductor.

The center windings, the first outer windings, and the second outer windings of the first set of windings or the second set of windings can be connected in series.

The first outer windings of the first set of windings or the second set of windings can be mutually coupled to the second outer windings via a first flux path between the first outer leg and the second outer leg of the magnetic core. The first outer windings and the second outer windings of the first set of windings can be configured to produce a first excitation voltage across the first outer windings and the second outer windings of the second set of windings. A number of turns of the first outer windings and the second outer windings can be based on the first excitation voltage across the first outer windings and the second outer windings of the second set of windings.

The first outer windings and the second outer windings of the first set of windings or the second set of windings can be uncoupled from the center windings.

The center windings of the first set of windings can be configured to produce a second excitation voltage across the center windings of the second set of windings. The second excitation voltage across the center windings of the second set of windings can be equal to a first excitation voltage across the first outer windings and the second outer windings of the second set of windings. A second direction of the second excitation voltage is opposite a first direction of the first excitation voltage. A number of turns of the center windings can be based on the second excitation voltage across the center windings of the second set of windings.

A first excitation voltage produced at the first set of windings of the first inductor and a second excitation voltage produced at the second set of windings of the second inductor can be independent of a phase of a first current through the first set of windings or a second current through the second set of windings. A first amount of current passing through the first set of windings can be independent of a second amount of current passing through the second set of windings.

A width of the center leg, the first outer leg, or the second outer leg of the magnetic core can be based on excitation voltages across the first set of windings or the second set of windings.

In another exemplary implementation, a process can include: determining operational characteristics of a power transfer system including boost converter circuitry configured to provide power to an electrical load from one or more power sources via one or more power transfer stages that each include a corresponding inductor; determining properties of an integrated inductor assembly including a magnetic core including a center leg in parallel with a first outer leg and a second outer leg on either side of the center leg, a first set of windings of a first inductor wrapped around the center leg, the first outer leg, and the second outer leg of the magnetic core, and a second set of windings of a second inductor wrapped around the center leg, the first outer leg, and the second outer leg of the magnetic core based on the operational characteristics of the power transfer system, wherein the first set of windings and the second set of windings include center windings wrapped around the center leg of the magnetic core, first outer windings wrapped around the first outer leg of the magnetic core, and second outer windings wrapped around the second outer leg of the magnetic core; and modifying properties of the magnetic core, the first set of windings, or the second set of windings to maintain independent operations of the first inductor and the second inductor.

Determining the operational characteristics of the power transfer system can further include determining a worst case voltage difference between the one or more power sources during failure of one of the one or more power sources.

In a further exemplary implementation, a system can include boost converter circuitry configured to provide power to an electrical load from one or more power sources via one or more power transfer stages that each includes a corresponding inductor. The system can also include an integrated inductor assembly including a magnetic core including a center leg in parallel with a first outer leg and a second outer leg on either side of the center leg; a first set of windings of a first inductor for a first power transfer stage of the boost converter circuitry wrapped around the center leg, the first outer leg, and the second outer leg of the magnetic core; and a second set of windings of a second inductor for a second power transfer stage of the boost converter circuitry wrapped around the center leg, the first outer leg, and the second outer leg of the magnetic core. The first set of windings and the second set of windings include center windings wrapped around the center leg of the magnetic core, first outer windings wrapped around the first outer leg of the magnetic core, and second outer windings wrapped around the second outer leg of the magnetic core.

The foregoing general description of exemplary implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
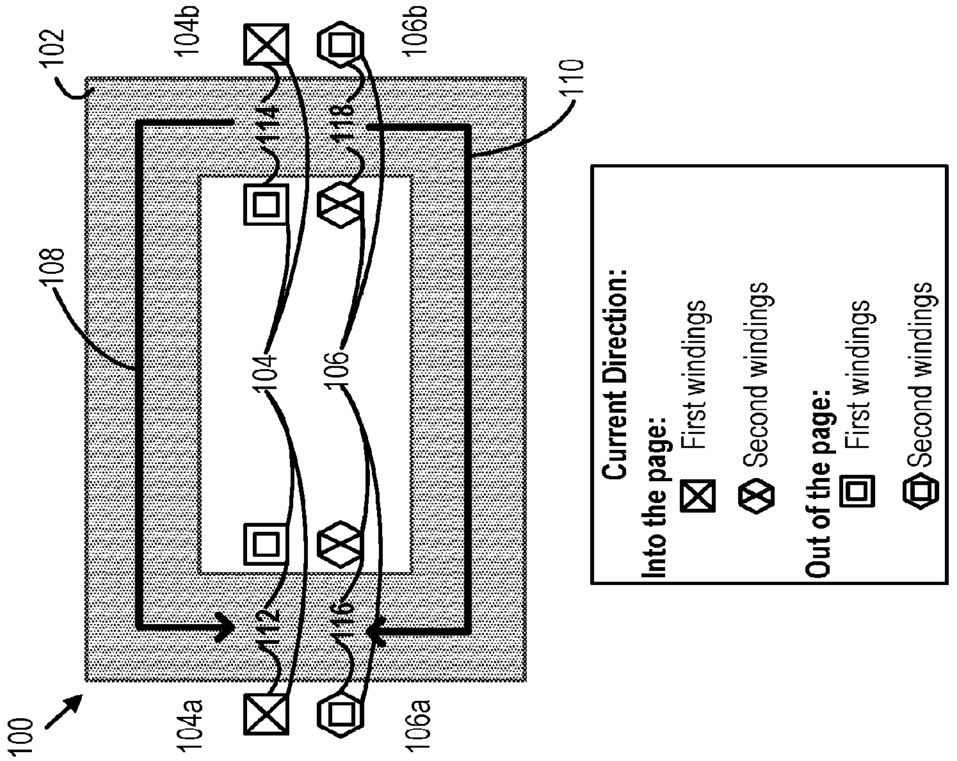
Fig. 1A Related Art
FIG. 1A is an exemplary illustration of a related art integrated inductor assembly.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

Aspects of the present disclosure are directed an integrated inductor assembly that includes multiple independently-operating inductors integrated onto a single magnetic core. For example, power conversion circuits, such as boost converter circuits, can have multiple inductors associated with one or more power conversion stages that independently provide power to one or more loads. Implementing the inductors as individual components each including separate magnetic cores can result increased circuit sizes due to the bulkiness of the magnetic cores. Integrating more than one inductor onto a single magnetic core can contribute to a size reduction in power conversion circuits, such as DC-DC power conversion circuit installed in electric vehicle (EV) power transfer systems that provide power from energy modules to electric loads of the EV.

Figure 1B:
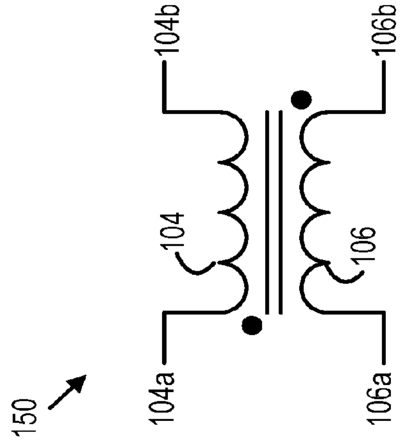
Fig. 1B Related Art
FIG. 1B is an exemplary equivalent circuit diagram of a related art integrated inductor assembly.

FIG. 1A is an exemplary two-dimensional (2-D) illustration of a related art interleaving integrated inductor assembly 100, and FIG. 1B is an exemplary equivalent circuit diagram 150 for the integrated inductor assembly 100. The integrated inductor assembly 100 includes an "O"-shaped magnetic core 102 with two legs around which a first set of windings associated with a first inductor 104 and a second set of windings associated with a second inductor 106 are wrapped. In some implementations, the first set of windings associated with the first inductor 104 are wrapped around an upper half of the legs of the magnetic core 102, and the second set of windings associated with the second inductor 106 are wrapped around a lower half of the legs of the magnetic core 102. The first set of windings associated with the first inductor 104 includes windings 112 and 114, which are connected in series. Also, the second set of windings associated with the second inductor 106 includes windings 116 and 118, which are connected in series. References to an upper half and a lower half of the magnetic core 102 are merely meant to differentiate between the halves of the magnetic core 102 and either set of windings can be associated with either half of the magnetic core 102. In addition, reference points 104*a* and 104*b* on the integrated inductor assembly 100 in FIG. 1A correspond to reference points 104*a* and 104*b* on the equivalent circuit diagram 150 in FIG. 1B. Likewise, reference points 106*a* and 106*b* on the integrated inductor assembly 100 in FIG. 1A correspond to reference points 106*a* and 106*b* on the equivalent circuit diagram 150 in FIG. 1B.

Flux path 110 corresponds to the flux produced by the first set of windings of the first inductor 104, and flux path 108 corresponds to the flux produced by the second set of windings of the second inductor 106. When currents through the first set of windings of the first inductor 104 and the second set of windings of the second inductor 106 are equal and have a predetermined amount of phase shift, the flux paths 108 and 110 cancel, which results in independent operations of the first inductor 104 and the second inductor 106 without core saturation. However, if the currents through the first set of windings of the first inductor 104 and the second set of windings of the second inductor 106 are not equal or do not have the predetermined amount of phase shift, the flux paths 108 and 110 do not cancel each other out, the magnetic core 102 becomes saturated, and the inductors 104 and 106 do not operate independently of one another.

Figure 2:
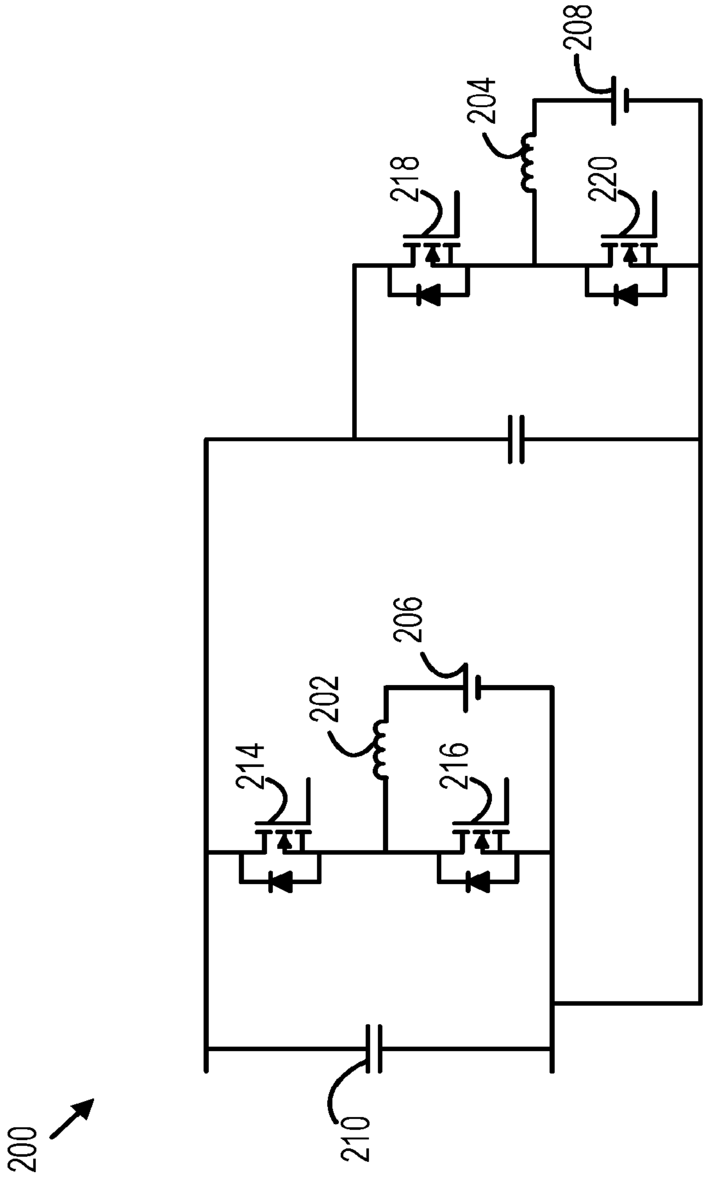
FIG. 2 is an exemplary schematic diagram of a boost converter circuit.

FIG. 2 is an exemplary schematic diagram of a boost converter circuit 200 in which the integrated inductor assembly 100 or any other integrated inductor assembly discussed further herein can be implemented. The boost converter circuit 200 can provide power to a variable voltage load 210, such as a vehicle motor, from one or more power sources, such as battery 206 and/or battery 208. For example, the battery 206 is associated with a first power transfer stage that includes switches 214 and 216 and inductor 202, and the battery 208 is associated with a second power transfer stage that includes switches 218 and 220 and inductor 204. In addition, the inductor 202 for the first power transfer stage and the inductor 204 for the second power transfer stage can be implemented as individual inductors or as an integrated inductor assembly, such as the inductor assembly 100. Implementing the inductors 202 and 204 as the integrated inductor assembly 100 or another type of integrated inductor assembly can result in a reduced circuit volume of the boost converter circuit 200 due to a reduced total inductor volume. However, if the currents through the inductors 202 and 204 are not equal and/or do not have a predetermined amount of phase shift, the inductors 202 and 204 do not operate independently, and the amount of power transferred from the batteries 206 and 208 may not be able to be controlled. In one example, when a failure of the battery 208 occurs, only the battery 206 provides power to the load 210, and an amount of current flowing through the inductor 204 associated with the battery 208 is zero while an amount of current flowing through the inductor 202 associated with the battery 206 is greater than zero, such as 100 Amps (A). The difference in current through the inductors 202 and 204 during failure of the battery 208 can result in core saturation of the integrated inductor assembly 100, and the inductors 202 and 204 do not operate independently of one another.

Figure 3A:
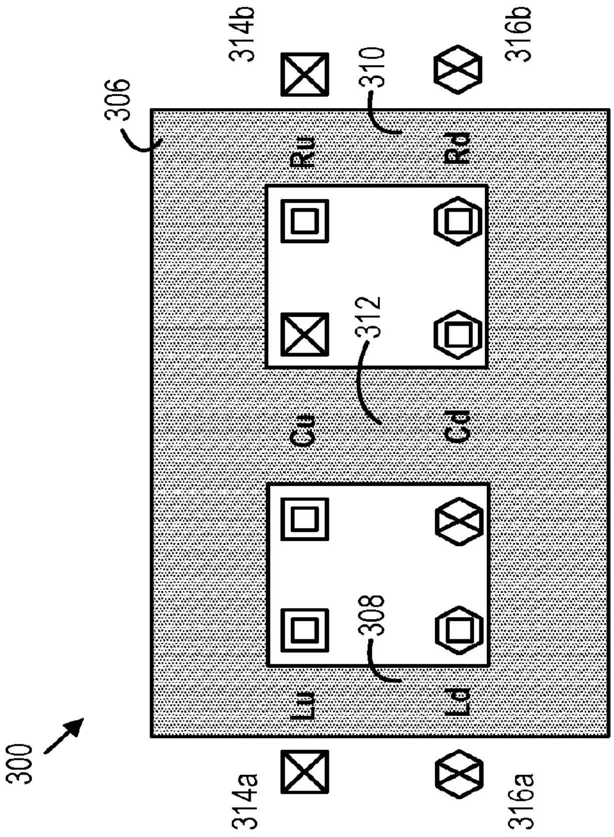
FIG. 3A is an exemplary illustration of an integrated inductor assembly.
Figure 3B:
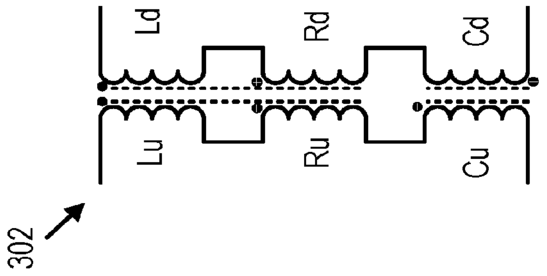
FIG. 3B is an exemplary schematic diagram of an integrated inductor assembly.
Figure 3C:
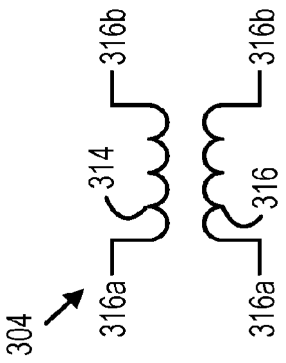
FIG. 3C is an exemplary equivalent circuit diagram of an integrated inductor assembly.

FIG. 3A is an exemplary 2-D illustration of an integrated inductor assembly 300, FIG. 3B is an illustration of a corresponding schematic diagram 302 that represents the integrated inductor assembly 300, and FIG. 3C is an exemplary equivalent circuit diagram 304 of the integrated inductor assembly 300. The integrated inductor assembly 100 has a magnetic core 306 with three legs that include a first outer leg 308, a second outer leg 310, and a center leg 312 in parallel around which a first set of windings associated with a first inductor 314 and a second set of windings associated with a second inductor 316 (as shown in FIG. 3C) are wrapped. The first set of windings associated with the first inductor 314 includes windings Lu, Ru, and Cu, which are connected in series. Also, the second set of windings associated with the second inductor 316 includes windings Ld, Rd, and CD, which are connected in series. In some implementations, the first set of windings Lu, Ru, and Cu associated with the first inductor 314 are wrapped around an upper half of the first outer leg 308, second outer leg 310, and center leg 312 of the magnetic core 306. The second set of windings Ld, Rd, and Cd associated with the second inductor 316 are wrapped around a lower half of the first outer leg 308, second outer leg 310, and center leg 312 of the magnetic core 306. Throughout the disclosure, references to an upper half and a lower half of the magnetic core 102 are meant to differentiate between the halves of the magnetic core 306 and can be associated with either half of the magnetic core 306.

In addition, reference points 314*a* and 314*b* on the integrated inductor assembly 300 in FIG. 3A correspond to reference points 314*a* and 314*b* on the schematic diagram 302 in FIG. 3B and the equivalent circuit diagram 304 in FIG. 3C. Likewise, reference points 316*a* and 316*b* on the integrated inductor assembly 300 in FIG. 3A correspond to reference points 316*a* and 316*b* on the schematic diagram 302 in FIG. 3B and the equivalent circuit diagram 304 in FIG. 3C. In some examples, the upper half of the magnetic core 306 can be separated from the lower half of the magnetic core 306 by an air gap in the first outer leg 308, second outer leg 310, and center leg 312 corresponding to predetermined inductance properties of the first inductor 314 and the second inductor 316.

The schematic diagram 302 of the integrated inductor assembly 300 in FIG. 3B illustrates polarities for the first set of windings Lu, Ru, and Cu and the second set of windings Ld, Rd, and Cd. Also, as current passes through the windings of the integrated inductor assembly 300, mutual coupling can occur between the first set of windings Lu, Ru, and Cu and the second set of windings Ld, Rd, and Cd. For example, mutual coupling can occur between the outer windings of the first set of windings Lu and Ru and the other windings of the first set of windings Ld and Rd. Also, mutual coupling also occurs between the center windings of the first set of windings Cu and the center windings of the second set of windings Cd. Even though mutual coupling between the first set of windings Lu, Ru, and Cu and the second set of windings Ld, Rd, and Cd occurs, the first inductor 314 and the second inductor 316 can operate independently even when an amount of current and/or phase shift are varied. For example, the first inductor 314 is configured to produce a first amount of flux in response to an input current through the first set of windings Lu, Ru, and Cu that is independent of a second amount of flux produced by the second inductor 316. Details regarding the independent operations between the first set of windings Lu, Ru, and Cu of the first inductor 314 and the second set of windings Ld, Rd, and Cd of the second inductor 316 are discussed further herein.

Figure 4A:
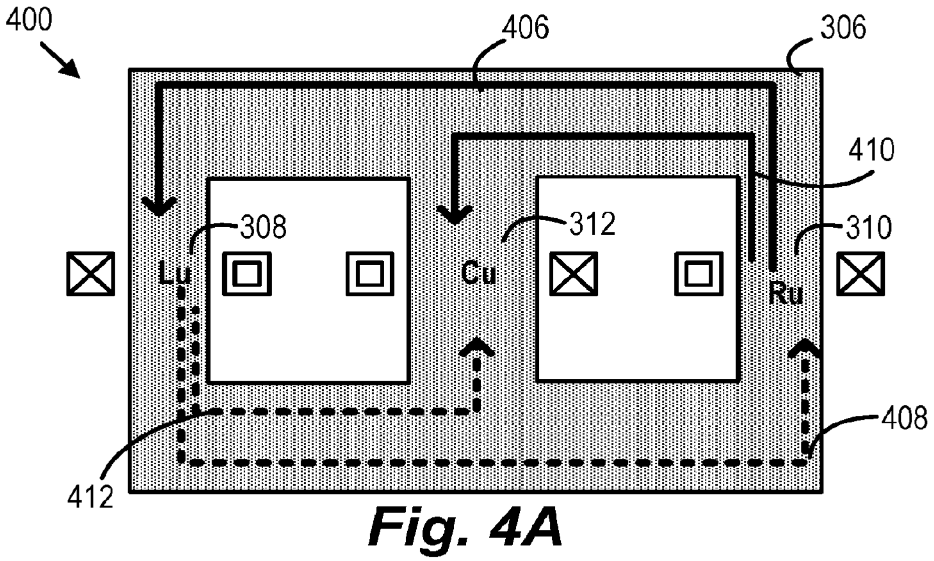
FIG. 4A is an exemplary illustration of an integrated inductor assembly.
Figure 4B:
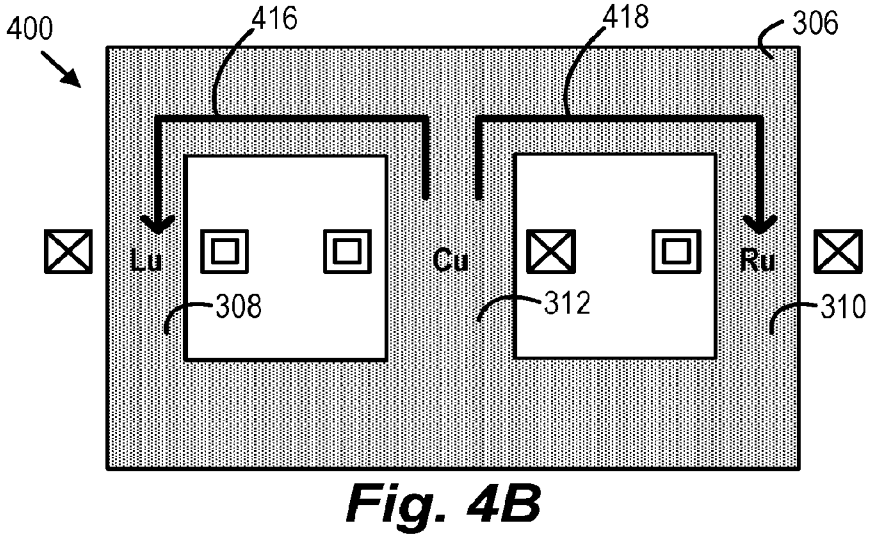
FIG. 4B is an exemplary illustration of an integrated inductor assembly.
Figure 4C:
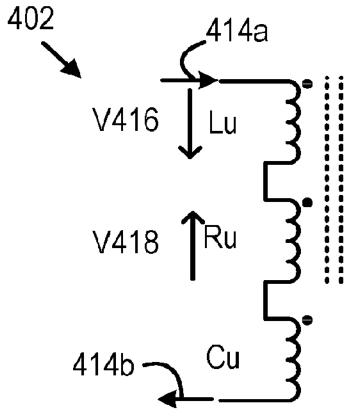
FIG. 4C is an exemplary schematic diagram of an integrated inductor assembly.

FIGS. 4A-4C illustrate flux paths and operation of the integrated inductor assembly 300 with respect to the first set of windings Lu, Ru, and Cu but can also be similarly applied to flux interactions between the second set of windings Ld, Rd, and Cd. For example, FIGS. 4A and 4B are exemplary 2-D illustrations of an integrated inductor assembly 400 with the first set of windings Lu, Ru, and Cu and FIG. 4C is an exemplary schematic diagram 402 of the first set of windings of the integrated inductor assembly 400. Current flows through the first set of windings Lu, Ru and Cu in a direction as shown by current arrows 414*a* and 414*b* in FIG. 4C. FIG. 4A shows that as current flows through the first set of windings Lu, Cu, and Ru, flux path 108 is produced from the first outer leg 308 to the second outer leg 310 of the magnetic core 306, and flux path 406 is produced from the second outer leg 310 to the first outer leg 308 of the magnetic core 306. In addition, the flux paths 406 and 408 between the outer legs of the magnetic core 306 result in mutual coupling between the outer windings Lu and Ru. In addition, flux path 412 is produced from the first outer leg 308 to the center leg 312, and flux path 410 is produced from the second outer leg 310 to the center leg 312. The flux paths 410 and 412 have opposite directions and cancel each other out, which results in zero flux within the center leg 312 of the magnetic core, and the outer windings Lu and Ru are uncoupled from the center windings Cu.

FIG. 4B shows that as current flows through the first set of windings Lu, Cu, and Ru, flux path 416 is produced from the center leg 312 to the first outer leg 308 of the magnetic core 306, and flux path 418 is produced from the center leg to the second outer leg 310 of the magnetic core 306. The flux path 416 produces excitation voltage V416 (as shown in FIG. 4C) across the windings Lu in one direction and the flux path 418 produces excitation voltage V418 across the windings Ru in another direction that is opposite the direction of the excitation voltage V416. The excitation voltages V416 and V418 cancel each other out due to the opposite directions and result in any flux generated due to current passing through the windings Cu including no effect on the windings Lu and Ru. Therefore, from a perspective of input current terminal 414*a*, the windings Lu, Ru, and Cu appear as two inductors where the outer windings Lu and Ru appear as one inductor and the center windings Cu appear as another inductor.

Figure 5B:
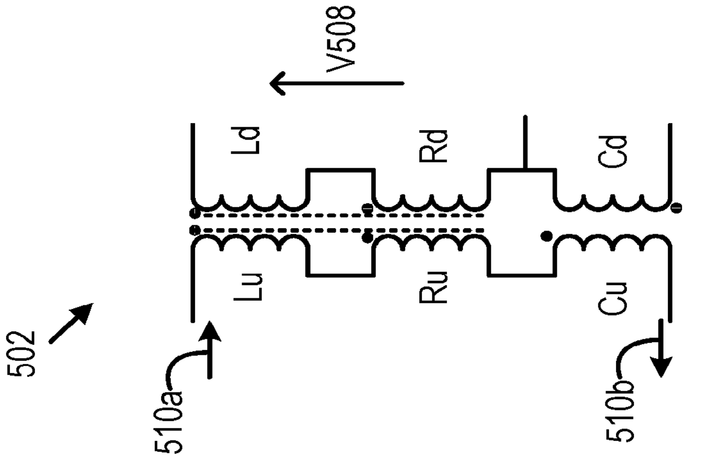
FIG. 5B is an exemplary schematic diagram of an integrated inductor assembly.
Figure 5A:
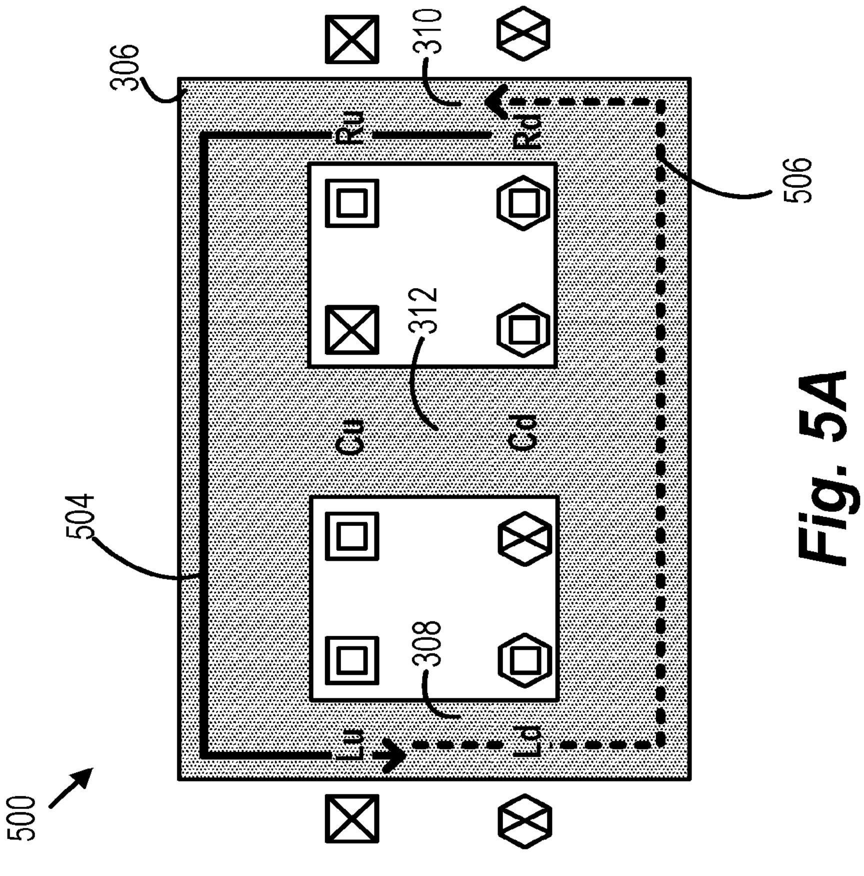
FIG. 5A is an exemplary illustration of an integrated inductor assembly.

FIGS. 5A and 5B illustrate flux paths and operation of the integrated inductor assembly 300 with respect to the first set of windings Lu, Ru, and Cu and the second set of windings Ld, Rd, and Cd. For example, FIG. 5A is an exemplary 2-D illustration of an integrated inductor assembly 500 with the first set of windings Lu, Ru, and Cu and the second set of windings Ld, Rd, and Cd that shows flux interactions between the outer windings Lu, Ru, Ld, and Rd. FIG. 5B is an exemplary schematic diagram 502 of the integrated inductor assembly 500 that includes interactions between the first set of windings Lu, Ru, and Cu and the second set of windings Ld, Rd, and Cd. Current flows through the first set of windings Lu, Ru and Cu in a direction as shown by current arrows 510*a* and 510*b* in FIG. 5B. As shown in FIG. 5A, as current flows through the first set of windings Lu, Ru, and Cu, flux path 506 is produced from the first outer leg 308 to the second outer leg 310 of the magnetic core 306 and flux path 504 is produced from the second outer leg 310 to the first outer leg 308 of the magnetic core 306. The flux paths 504 and 506 result in mutual coupling between the outer windings Lu and Ru of the first set of windings and the outer windings Ld and Rd of the second set of windings. As the mutual coupling occurs, excitation voltage V508 is produced across the outer windings Ld and Rd of the second set of windings, but no mutual coupling is produced between the center windings Cd of the second set of windings and the outer windings Lu and Ru of the first set of windings.

Figure 6B:
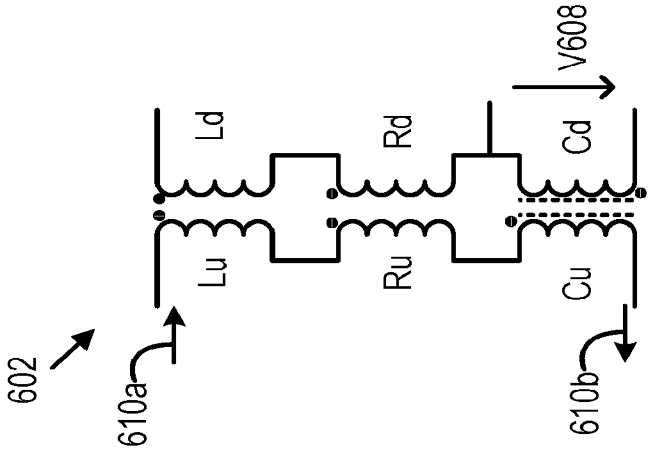
FIG. 6B is an exemplary schematic diagram of an integrated inductor assembly.
Figure 6A:
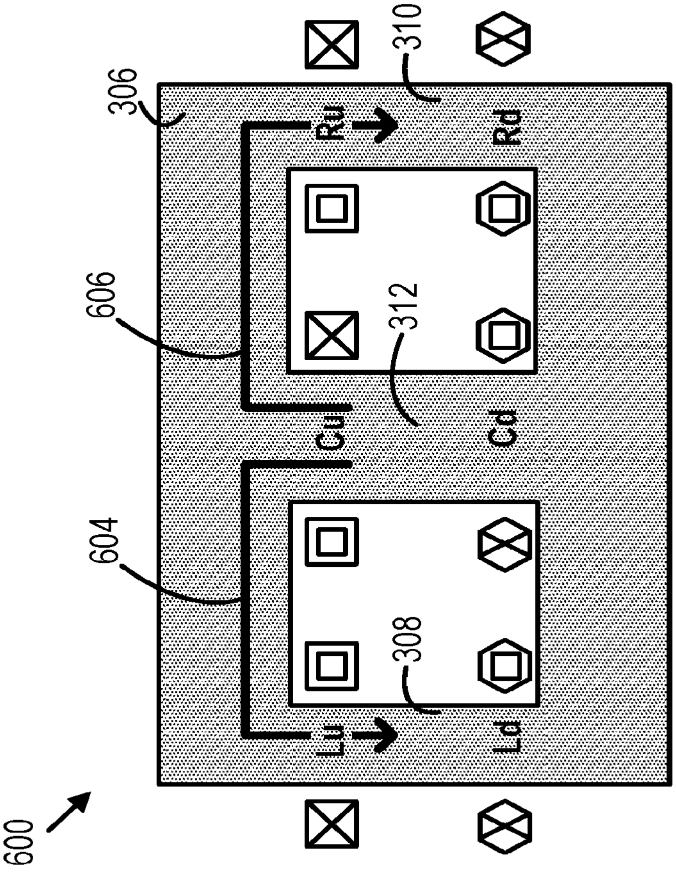
FIG. 6A is an exemplary illustration of an integrated inductor assembly.

FIGS. 6A and 6B illustrate flux paths and operation of the integrated inductor assembly 300 with respect to the first set of windings Lu, Ru, and Cu and the second set of windings Ld, Rd, and Cd. For example, FIG. 6A is an exemplary 2-D illustration of an integrated inductor assembly 600 with the first set of windings Lu, Ru, and Cu and the second set of windings Ld, Rd, and Cd that shows flux interactions of the center windings Cu and Cd. FIG. 6B is an exemplary schematic diagram 602 of the integrated inductor assembly 600 that includes interactions between the first set of windings Lu, Ru, and Cu and the second set of windings Ld, Rd, and Cd. Current flows through the first set of windings Lu, Ru and Cu in a direction as shown by current arrows 610*a* and 610*b* in FIG. 6B. As shown in FIG. 6A, as current flows through the first set of windings Lu, Ru, and Cu, flux path 604 is produced from the center leg 312 to the first outer leg 308 of the magnetic core 306 and flux path 606 is produced from the center leg 312 to the second outer leg 310 of the magnetic core 306. The flux paths 604 and 606 cause excitation voltage V608 to be produced across the center windings Cd of the second set of windings, but no mutual coupling occurs between the center windings Cu of the first set of windings and the outer windings Ld and Rd of the second set of windings.

In some implementations, the excitation voltage V608 across the center windings Cd of the second set of windings is opposite in direction from the excitation voltage V508 across the outside windings Ld and Rd. When the magnitudes of the excitation voltages V508 and V608 are equal, the excitation voltages V508 and V608 cancel, and a total voltage across the second set of windings Ld, Rd, and Cd due to the current through the first set of windings Lu, Ru, and Cu is zero. When the total voltage across the second set of windings Ld, Rd, and Cd due to the current through the first set of windings Lu, Ru, and Cu is zero, the first inductor 314 and the second inductor 316 of the integrated inductor assembly 300 operate independently. The structure of the integrated inductor assembly 300 can be designed so that magnitudes of the excitation voltages V508 and V608 are equal. For example, dimensions of the magnetic core 306 such as widths of the legs 308, 310, and 312 can be increased or decreased to modify the excitation voltage V508 or V608. In one example, the width of the center leg 312 is increased in order to increase the excitation voltage V608 across the center windings Cd of the second set of windings. In addition, other design characteristics of the integrated inductor assembly 300 can be modified, such as number of winding turns, types of windings, other dimensions of the magnetic core 306, and the like. In addition, even though the flux paths and excitation voltages are described herein with respect to current passing through the first set of windings Lu, Ru, and Cu, the inductors 314 and 316 also operate independently when current passes through the second set of windings Ld, Rd, and Cd or both sets of windings.

Figure 7A:
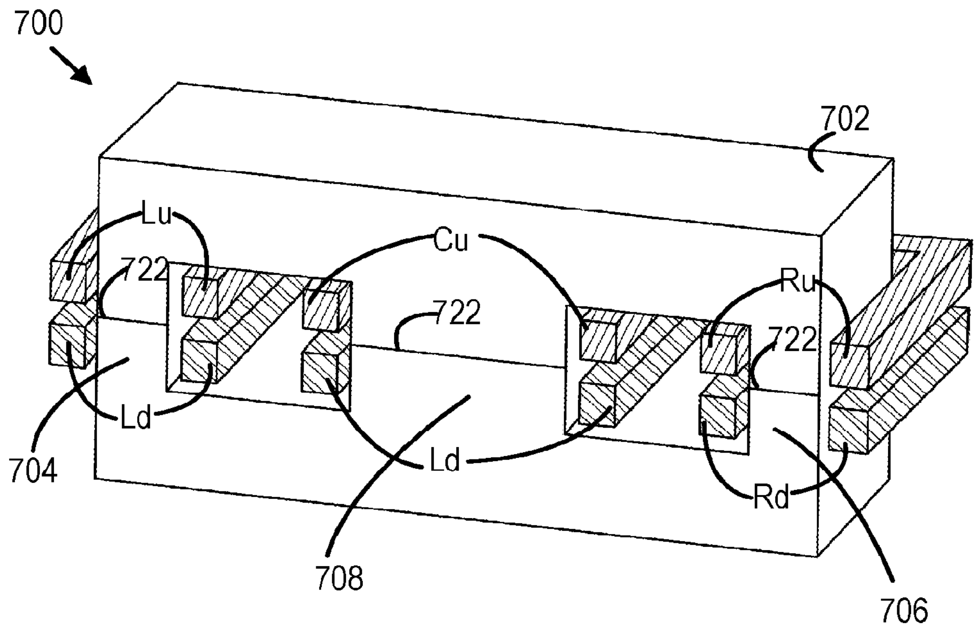
FIG. 7A is an exemplary illustration of an integrated inductor assembly.

FIG. 7A is an exemplary three-dimensional (3-D) illustration of an integrated inductor assembly 700, which is one implementation of the integrated inductor assembly 300. For example, the integrated inductor assembly includes a magnetic core 702 with a first outer leg 704, a second outer leg 706, and a center leg 708 around which a first set of windings Lu, Ru, and Cu associated with a first inductor and a second set of windings Ld, Rd, and Cd associated with a second inductor are wrapped. In some implementations, dimensions of the magnetic core 702 and a length or width of the first outer leg 704, second outer leg 706, and center leg 708 are based on maintaining independence between the first inductor 314 and the second inductor 316 so that flux generated by the first set of windings Lu, Ru, and Cu and the second set of windings Ld, Rd, and Cd do not interfere with one another. In addition, the number of winding turns, type of windings, and length of air gap 722 between a first half and a second half of the magnetic core 702 can also affect the independent operations as well as operational characteristics of the first inductor 314 or second inductor 316. In one implementation, increasing the length of the air gap 722 between the first half and second half of the magnetic core 702 reduces an inductance value of the first inductor 314 or second inductor 316.

Figure 7B:
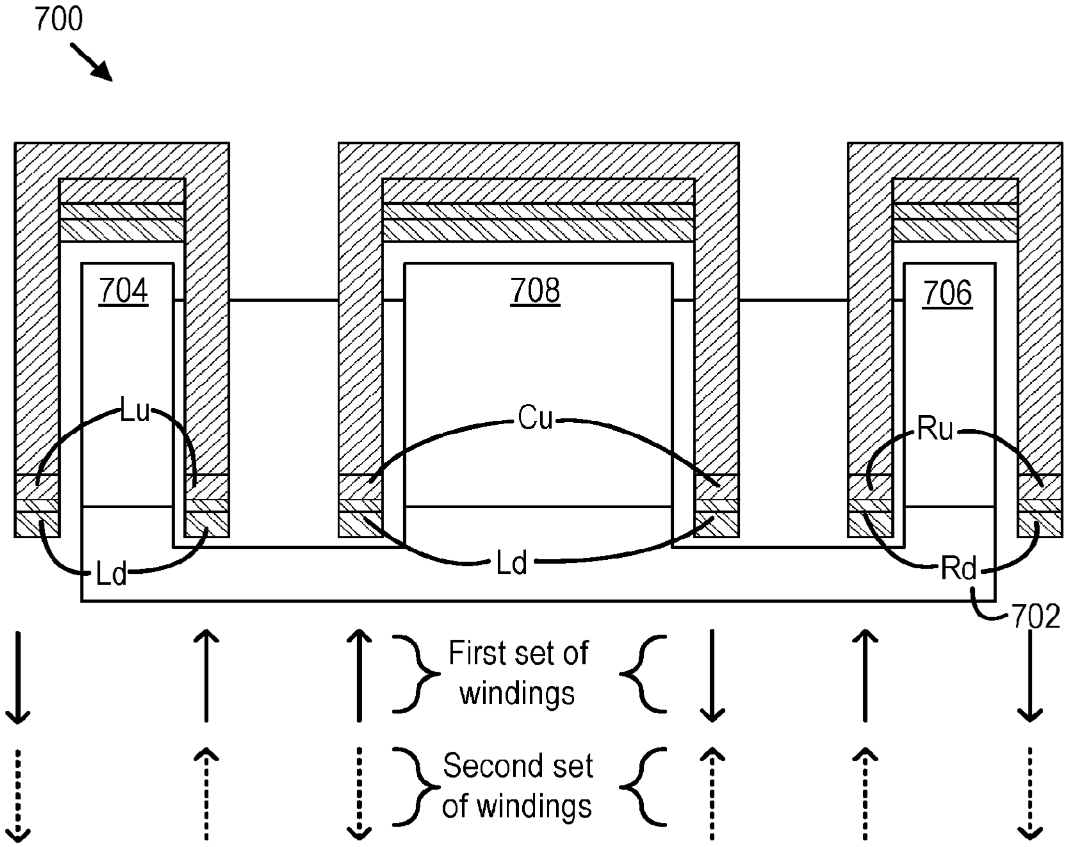
FIG. 7B is an exemplary illustration of a half of a magnetic core of an integrated inductor assembly.

FIG. 7B is an exemplary 3-D illustration of the integrated inductor assembly 700 that shows only one half of the magnetic core 702 and also includes current directions for the first set of windings Lu, Ru, and Cu and the second set of windings Ld, Rd, and Cd of the integrated inductor assembly 700. The half of the magnetic core 702 in FIG. 7B shows that a width of the center leg 708 is greater than widths of the first outer leg 704 and second outer leg 706. In some implementations, as the width of the center leg 708 is increased, the excitation voltage V608 across the center windings Cd of the second set of windings increases. Also, the number of turns of the center windings Cu or Cd can be based on the excitation voltage V608. Likewise, the widths of the first outer leg 704 and second outer leg 706 are based on the excitation voltage V508 across the outer windings Ld and Rd which is equal to the excitation voltage V608 across the center windings Cd. In addition, the number a number of turns of the outer windings Lu, Ru, Ld, or Rd can be based on the excitation voltage V508, and the number of turns of the center windings Cu or Cd can be based on the excitation voltage V608.

Figure 8A:
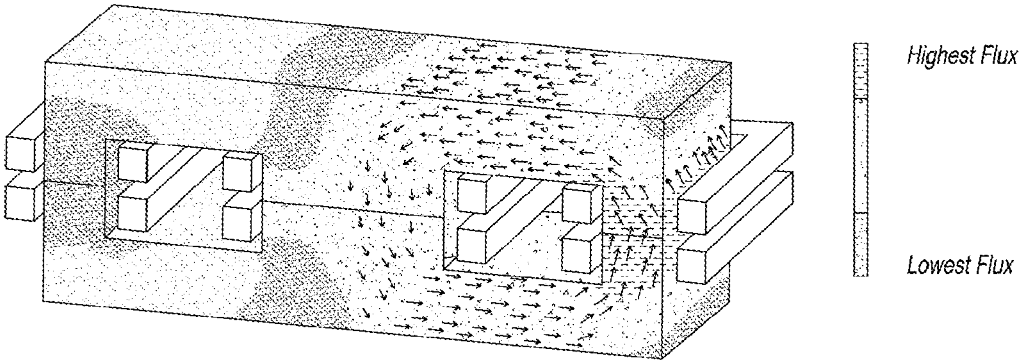
FIG. 8A is an exemplary illustration of a flux profile for an integrated inductor assembly.
Figure 8B:
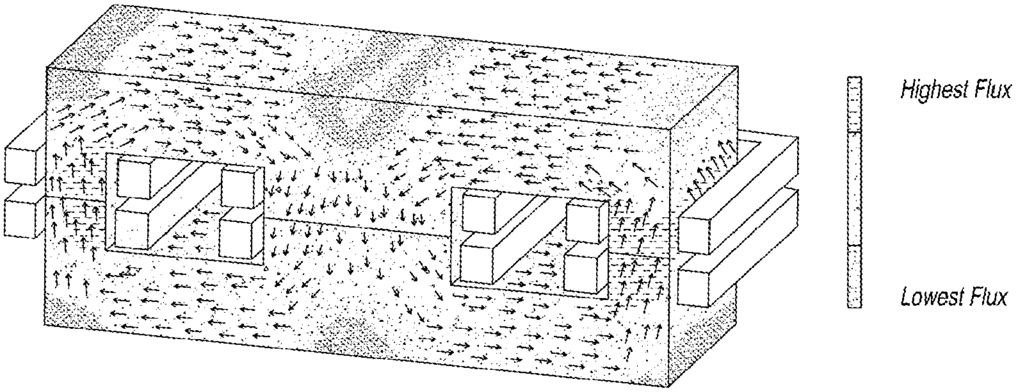
FIG. 8B is an exemplary illustration of a flux profile for an integrated inductor assembly.
Figure 8C:
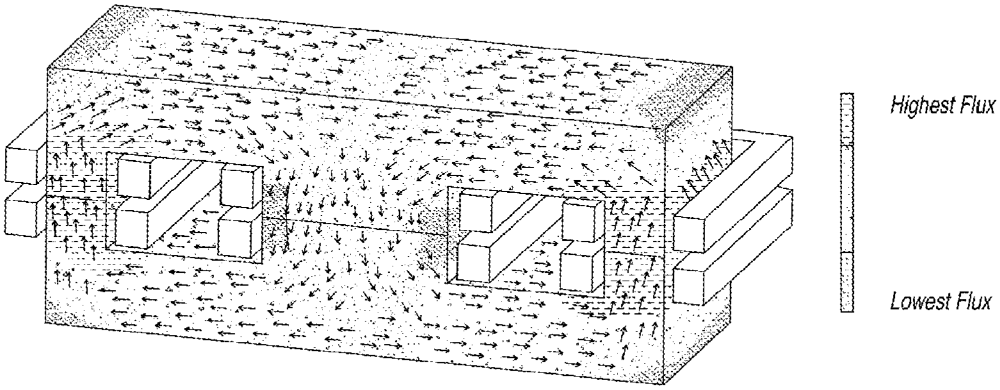
FIG. 8C is an exemplary illustration of a flux profile for an integrated inductor assembly.

FIGS. 8A-8C are exemplary illustrations of flux profiles for the integrated inductor assembly 300, and Table 1 includes corresponding operational characteristics of the integrated inductor assembly 300. FIG. 8A is a flux profile for the integrated inductor assembly 300 in one implementation where the first set of windings Lu, Ru, and Cu of the first inductor 314 have an applied current of 6.5 A at a frequency of 200 kiloHertz (kHz), and the second set of windings Ld, Rd, and Cd of the second inductor 316 have no current applied. As indicated in Table 1, the first set of windings Lu, Ru, and Cu have a voltage of approximately 50V, and the second set of windings Ld, Rd, and Cd have a voltage of approximately zero volts. Also, the first set of windings Lu, Ru, and Cu associated with the first inductor 314 have an inductance value of 6.1 microHenries (μH), and the second set of windings Ld, Rd, and Cd associated with the second inductor 316 have an inductance value of zero microHenries. Even though the amounts currents applied to the first set of windings and the second set of windings are not equal, the operational characteristics of the first set of windings Lu, Ru, and Cu are independent of the operational characteristics of the second set of windings Ld, Rd, and Cd.

FIG. 8B is a flux profile for the integrated inductor assembly 300 in one implementation where the first set of windings Lu, Ru, and Cu of the first inductor 314 and the second set of windings Ld, Rd, and Cd of the second inductor have an applied current of 6.5 A at a frequency of 200 kHz. In addition, the currents through the first set of windings Lu, Ru, and Cu and the second set of windings Ld, Rd, and Cd have zero phase shift, which can also be referred to as in-phase. As indicated in Table 1, both the first set of windings Lu, Ru, and Cu and the second set of windings Ld, Rd, and Cd have a voltage of approximately 50V. Also, the both the first set of windings Lu, Ru, and Cu associated with the first inductor 314 and the second set of windings Ld, Rd, and Cd associated with the second inductor 316 have an inductance value of 6.1 μH.

TABLE 1

| | FIG. 8A | FIG. 8B | FIG. 8C |
|---|---|---|---|
| Frequency | 200 kHz | 200 kHz | 200 kHz |
| $V_{first}$ | 50 V | 50 V | 50 V |
| $V_{second}$ | 0 V | 50 V | 50 V |
| Phase shift | 0° | 0° | 180° |
| $I_{first}$ | 6.5 A | 6.5 A | 6.5 A |
| $I_{second}$ | 0 A | 6.5 A | 6.5 A |
| $L_{first}$ | 6.1 μH | 6.1 μH | 6.1 μH |
| $L_{second}$ | 0 μH | 6.1 μH | 6.1 μH |

FIG. 8C is a flux profile for the integrated inductor assembly 300 in one implementation where the first set of windings Lu, Ru, and Cu of the first inductor 314 and the second set of windings Ld, Rd, and Cd of the second inductor have an applied current of 6.5 A at a frequency of 200 kHz. In addition, the currents through the first set of windings Lu, Ru, and Cu and the second set of windings Ld, Rd, and Cd have a 180° phase shift. As indicated in Table 1, both the first set of windings Lu, Ru, and Cu and the second set of windings Ld, Rd, and Cd have a voltage of approximately 50V. Also, the both the first set of windings Lu, Ru, and Cu associated with the first inductor 314 and the second set of windings Ld, Rd, and Cd associated with the second inductor 316 have an inductance value of 6.1 μH. Even though the currents through the first set of windings Lu, Ru, and Cu and the second set of windings Ld, Rd, and Cd are out of phase, the operational characteristics of the first set of windings Lu, Ru, and Cu are independent of the operational characteristics of the second set of windings Ld, Rd, and Cd.

Figure 9:
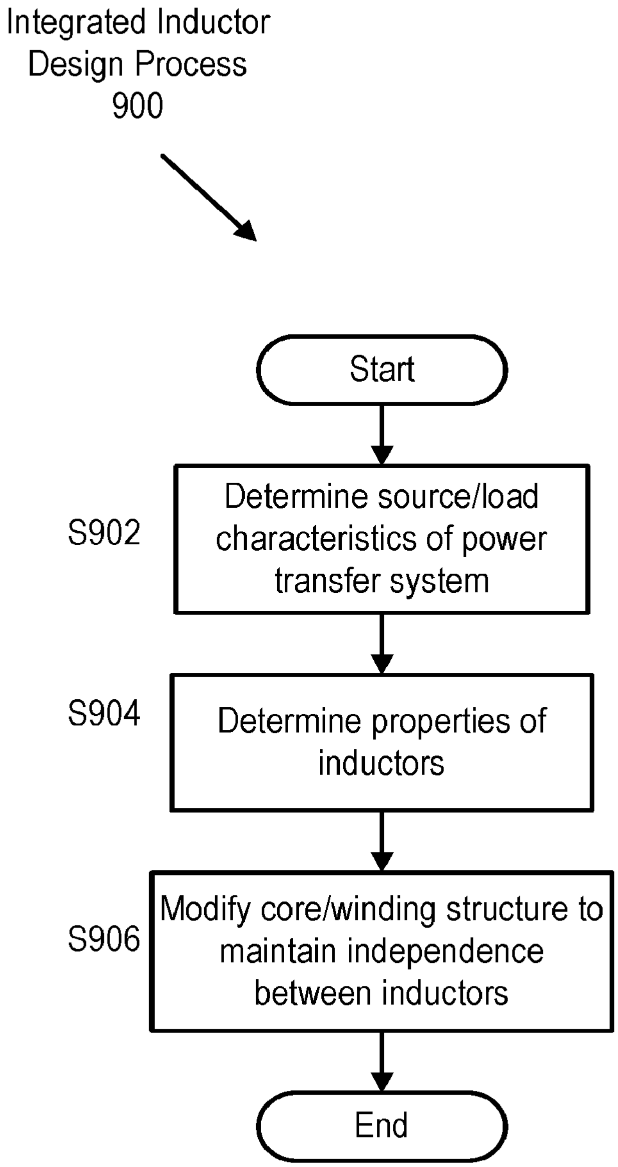
FIG. 9 is an exemplary flowchart of an integrated inductor design process.

FIG. 9 is an exemplary flowchart of an integrated inductor design process 900. The integrated inductor design process 900 is described herein with respect to the integrated inductor assembly 300 and the boost converter circuit 200, but the integrated inductor design process 900 can also be applied to other types of integrated inductor assemblies and power conversion circuits.

At step S902, operational characteristics of a power transfer system, such as the boost converter circuit 200 are determined. For example, the boost converter circuit 200 includes two power transfer stages that independently supply power from the battery 206 and battery 208 to the variable voltage load 210. The operational characteristics of the boost converter system 200 can include power and voltage characteristics of the batteries 206 and 208, power and voltage characteristics of the load 210, number of power transfer stages, and the like. In one implementation, the operational characteristics of the boost converter circuit 200 also include a worst case voltage difference between the batteries 206 and 208 during failure of one of the batteries 206 or 208. For example, when a failure of the battery 208 occurs, only the battery 206 provides power to the load 210, and an amount of current flowing through the inductor 204 associated with the battery 208 is zero while an amount of current flowing through the inductor 202 associated with the battery 206 is greater than zero, such as 100 A.

At step S904, properties of inductors associated with the boost converter circuit 200 are determined based on the operational characteristics of the power transfer system determined at step S902. For example, the worst case voltage difference between the batteries 206 and 208 can be used to design the inductors 314 and 316 of the integrated inductor assembly 300 so that inductors 314 and 316 operate independently when the worst case voltage difference occurs. In addition, the properties of the inductors 314 and 316 can include inductance values for each of the power transfer stages of the boost converter circuit 200. Physical properties of the integrated inductor assembly 300 can also be determined based on the operational characteristics of the boost converter circuit 200. For example, the dimensions of the magnetic core 306, length and width of the outer legs 308, 310 and center leg 308 of the magnetic core 306, turn number of the first set of windings Lu, Ru, and Cu and second set of windings Ld, Rd, and Cd, and the like, can be based on achieving a predetermined amount of inductance for each of the power transfer stages of the boost converter circuit 200.

At step S906, the magnetic core/winding structure or properties can be modified to maintain independent operations between the first set of windings Lu, Ru, and Cu of the first inductor 314 and the second set of windings Ld, Rd, and Cd of the second inductor 316. In some implementations, as the width of the center leg 312 is increased, the excitation voltage V608 across the center windings Cd of the second set of windings increases. Also, the number of turns of the center windings Cu or Cd can be based on the excitation voltage V608. Likewise, the widths of the first outer leg 308 and second outer leg 310 are based on the excitation voltage V508 across the outer windings Ld and Rd which is equal to the excitation voltage V608 across the center windings Cd. In addition, the number a number of turns of the outer windings Lu, Ru, Ld, or Rd can be based on the excitation voltage V508, and the number of turns of the center windings Cu or Cd can be based on the excitation voltage V608.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. Accordingly, other implementations are within the scope that may be claimed.

The invention claimed is:

1. An integrated inductor assembly comprising:
- a magnetic core including a center leg in parallel with a first outer leg and a second outer leg on either side of the center leg;
- a first set of windings of a first inductor wrapped around the center leg, the first outer leg of the magnetic core, and the second outer leg of the magnetic core; and
- a second set of windings of a second inductor wrapped around the center leg, the first outer leg, and the second outer leg of the magnetic core, wherein
- the first set of windings and the second set of windings include center windings wrapped around the center leg of the magnetic core, first outer windings wrapped around the first outer leg of the magnetic core, and second outer windings wrapped around the second outer leg of the magnetic core,
- polarities of the first and second outer windings of the first set of windings match polarities of the first and second outer windings of the second set of windings, and
- a polarity of the center winding of the first set of windings is opposite to a polarity of the center winding of the second set of windings.

2. The integrated inductor assembly of claim 1, wherein the first set of windings are wrapped around a first half of the center leg, the first outer leg, and the second outer leg of the magnetic core and the second set of windings are wrapped around a second half of the center leg, the first outer leg, and the second outer leg of the magnetic core.

3. The integrated inductor assembly of claim 2, wherein the first half of the center leg, the first outer leg, and the second outer leg of the magnetic core is separated from the second half of the center leg, the first outer leg, and the second outer leg of the magnetic core by an air gap corresponding to predetermined inductance properties of the first inductor and the second inductor.

4. The integrated inductor assembly of claim 1, wherein the first inductor is configured to produce a first amount of flux in response to an input current that is independent of a second amount of flux produced by the second inductor.

5. The integrated inductor assembly of claim 1, wherein the center windings, the first outer windings, and the second outer windings of the first set of windings or the second set of windings are connected in series.

6. The integrated inductor assembly of claim 1, wherein the first outer windings of the first set of windings or the second set of windings are mutually coupled to the second outer windings via a first flux path between the first outer leg and the second outer leg of the magnetic core.

7. The integrated inductor assembly of claim 6, wherein the first outer windings and the second outer windings of the first set of windings are configured to produce a first excitation voltage across the first outer windings and the second outer windings of the second set of windings.

8. The integrated inductor assembly of claim 7, wherein a number of turns of the first outer windings and the second outer windings is based on the first excitation voltage across the first outer windings and the second outer windings of the second set of windings.

9. The integrated inductor assembly of claim 1, wherein the first outer windings and the second outer windings of the first set of windings or the second set of windings are uncoupled from the center windings.

10. The integrated inductor assembly of claim 1, wherein the center windings of the first set of windings are configured to produce a second excitation voltage across the center windings of the second set of windings.

11. The integrated inductor assembly of claim 10, wherein the second excitation voltage across the center windings of the second set of windings is equal to a first excitation voltage across the first outer windings and the second outer windings of the second set of windings.

12. The integrated inductor assembly of claim 10, wherein a second direction of the second excitation voltage is opposite a first direction of the first excitation voltage.

13. The integrated inductor assembly of claim 10, wherein a number of turns of the center windings is based on the second excitation voltage across the center windings of the second set of windings.

14. The integrated inductor assembly of claim 1, wherein a first excitation voltage produced at the first set of windings of the first inductor and a second excitation voltage produced at the second set of windings of the second inductor are independent of a phase of a first current through the first set of windings or a second current through the second set of windings.

15. The integrated inductor assembly of claim 1, wherein a first amount of current passing through the first set of windings is independent of a second amount of current passing through the second set of windings.

16. The integrated inductor assembly of claim 1, wherein a width of the center leg, the first outer leg, or the second outer leg of the magnetic core are based on excitation voltages across the first set of windings or the second set of windings.

17. A method comprising:
- determining operational characteristics of a power transfer system including boost converter circuitry configured to provide power to an electrical load from one or more power sources via one or more power transfer stages that each include a corresponding inductor;
- determining properties of an integrated inductor assembly including
  - a magnetic core including a center leg in parallel with a first outer leg and a second outer leg on either side of the center leg,
  - a first set of windings of a first inductor wrapped around the center leg, the first outer leg, and the second outer leg of the magnetic core, and
  - a second set of windings of a second inductor wrapped around the center leg, the first outer leg, and the second outer leg of the magnetic core based on the operational characteristics of the power transfer system, wherein
  - the first set of windings and the second set of windings include center windings wrapped around the center leg of the magnetic core, first outer windings wrapped around the first outer leg of the magnetic core, and second outer windings wrapped around the second outer leg of the magnetic core,
  - polarities of the first and second outer windings of the first set of windings match polarities of the first and second outer windings of the second set of windings, and a polarity of the center winding of the first set of windings is opposite to a polarity of the center winding of the second set of windings; and modifying properties of the magnetic core, the first set of windings, or the second set of windings to maintain independent operations of the first inductor and the second inductor.

18. The method of claim 17, wherein determining the operational characteristics of the power transfer system further comprises determining a worst case voltage difference between the one or more power sources during failure of one of the one or more power sources.

19. A system comprising:

boost converter circuitry configured to provide power to an electrical load from one or more power sources via one or more power transfer stages that each include a corresponding inductor; and an integrated inductor assembly including a magnetic core including a center leg in parallel with a first outer leg and a second outer leg on either side of the center leg;

a first set of windings of a first inductor for a first power transfer stage of the boost converter circuitry wrapped around the center leg, the first outer leg, and the second outer leg of the magnetic core; and a second set of windings of a second inductor for a second power transfer stage of the boost converter circuitry wrapped around the center leg, the first outer leg, and the second outer leg of the magnetic core, wherein the first set of windings and the second set of windings include center windings wrapped around the center leg of the magnetic core, first outer windings wrapped around the first outer leg of the magnetic core, and second outer windings wrapped around the second outer leg of the magnetic core, polarities of the first and second outer windings of the first set of windings match polarities of the first and second outer windings of the second set of windings, and a polarity of the center winding of the first set of windings is opposite to a polarity of the center winding of the second set of windings.

* * * * *